United States Patent [19]
Kimura et al.

[11] Patent Number: 5,396,344
[45] Date of Patent: Mar. 7, 1995

[54] DIGITAL COPIER

[75] Inventors: Youichi Kimura, Nabari; Kimihito Yamasaki, Tenri, both of Japan

[73] Assignee: Sharp Kabushiki Kaisha, Osaka, Japan

[21] Appl. No.: 207,227

[22] Filed: Mar. 7, 1994

Related U.S. Application Data

[63] Continuation of Ser. No. 854,288, Mar. 20, 1992, abandoned.

[30] Foreign Application Priority Data

Mar. 25, 1991 [JP] Japan .................................. 3-060197

[51] Int. Cl.⁶ .......................... H04N 1/21; H04N 1/04
[52] U.S. Cl. .................................. 358/444; 358/450; 358/451; 358/496
[58] Field of Search ............... 358/444, 404, 450, 451, 358/452, 453, 496, 494, 474, 468, 524, 296; 395/115, 116; 355/319, 320, 23, 24

[56] References Cited

U.S. PATENT DOCUMENTS 5,107,338 4/1992 Saito ................................. 358/444

FOREIGN PATENT DOCUMENTS

0353028A3 1/1990 European Pat. Off. .
0376312A3 7/1990 European Pat. Off. .

OTHER PUBLICATIONS

Patent Abstracts of Japan vol. 11, No. 209 (E521) Jul. 1987 (Canon K.K.).
Patent Abstracts of Japan vol. 10, No. 302 (E445) (2358) 15 Oct. 1986 (Canon Inc.).

*Primary Examiner*—Scott A. Rogers
*Attorney, Agent, or Firm*—David G. Conlin; John L. Welch; Milton Oliver

[57] ABSTRACT

A digital copier is provided with mechanism for reading images of both sides of an original, and mechanism for storing image data read by the reading mechanism in an area of an image memory in order, and when a predetermined signal is applied thereto, for storing image data in the next area by one area. The predetermined signal may be generated when a skip key is depressed. Therefore, since it is not necessary to read images which needs not to be recorded, the appearance of the recorded images on a record sheet is improved and the processing time is shortened. The digital copier may be also provided with mechanism for storing blank data in remaining areas in the image memory when a predetermined signal is applied thereto. The predetermined signal may be generated when an end key is depressed.

3 Claims, 4 Drawing Sheets

Fig. 4

| (1) | (2) |
|---|---|
| (3) | (4) |
| (5) | (6) |
| (7) | (8) |
| (9) | (10) |
| (11) | (12) |

FRONT SIDE OF DOUBLE-SIDED ORIGINAL | REVERSE SIDE OF DOUBLE-SIDED ORIGINAL

| ABC | ××× |
|---|---|
| DEF | △△△ |
| XYZ |  |
| STU | ○○○ |
| MNO |  |
| HIJ | □□□ |

SKIPPED AREA

DIGITAL COPIER

This is a continuation of application Ser. No. 07/854,288, filed on Mar. 20, 1992, abandoned.

BACKGROUND OF THE INVENTION

1. Field of the Invention

The present invention relates to a digital copier capable of editing image data of originals.

2. Description of the Related Art

The conventional digital copier is capable of recording front-side image data of originals on the left half of a record sheet and reverse-side image data of the originals on the right half of the sheet. Therefore, by means of such a digital copier a plurality of small size double-sided originals such as visiting cards or post cards are recorded in order on a single large sheet, or a plurality of ordinary size double-sided originals are recorded in a reduced form in a single sheet.

The digital copier reads image data of the front and reverse sides of originals in the order in which they were recorded, and records the image data of the respective sides of the originals on recording areas of a record sheet in the same order as the reading.

Therefore, in such a case that originals involves image data which need not copied, an operator reluctantly record the image data on a record sheet as they are, or has to mark the record sheet after leaving out the unnecessary sides of the originals, or replacing the sides with blank. In both cases, it takes an extra time in reading the images of the unnecessary sides or the images of the blank sides of the originals, and in the former the record copy results in a poor appearance because of the unnecessary parts of the record copy.

Further, when the number of sides of originals is smaller than the number of recording areas of a record sheet, the operator has to do extra work for the remaining recording areas. That is, the operator has to manipulate a copy key without setting any original or by setting a blank sheet, so that the remaining recording areas are stored with blank data. Therefore, such a wasteful job results in an increase of the processing time.

SUMMARY OF THE INVENTION

It is therefore a first object of the present invention to provide a digital copier which does not need to read image data of unnecessary sides or blank sides involved in double-sided originals when recording a plurality of image data of the originals arranged on a record sheet, thus improving the appearance of the recorded images and shortening the processing time.

It is a second object of the present invention to provide a digital copier which can simplify the operation if the number of images of originals is smaller than the number of recording areas in a sheet and shorten the processing time.

The first object can be achieved by a digital copier comprising mechanism for reading images of both sides of an original, mechanism for storing image data read by the reading mechanism in an area of the image memory in order, and when a predetermined signal is applied thereto, for storing image data read after that by the reading mechanism in the next area by one area, and mechanism for recording all image data in the image memory on a record sheet.

The storing mechanism includes mechanism for skipping areas in the image memory according to the number of the predetermined signals applied, therefore the areas skipped are stored with blank data.

Preferably the predetermined signal is generated when a skip key is depressed.

In operation, the image reading mechanism reads images of both sides of an original and the images read are stored in order in areas in the image memory after preprocessing such as signal analog-to-digital conversion. When a predetermined signal is applied to a CPU controlling the reading mechanism and the storing mechanism, the next area in the image memory is skipped over and image data read after that is stored in the next area beyond the area skipped. Then all image data in the image memory are recorded on a record sheet in such a manner that the images of front-sides of the originals are recorded in a left-side frame of the sheet and the images of reverse-sides of the originals, for example.

Therefore, the appearance of the recorded images on a record sheet is improved and the processing time is shortened.

The second object can be achieved by a digital copier comprising mechanism for reading images of both sides of an original, mechanism for storing image data read by the reading mechanism in an area of an image memory in order, and when a predetermined signal is applied thereto, for storing blank data in remaining areas in the image memory, and mechanism for recording all image data in the image memory on a record sheet.

Preferably the predetermined signal is generated when an end key is depressed.

In operation, the image reading mechanism reads images of both sides of originals. When the predetermined signal is applied to the storing mechanism, all the remaining areas in the image memory are stored with blank data. Then all image data in the image memory are recorded on a record sheet in such a manner that the images of front-sides of the originals are recorded in a left-side frame of the sheet and the images of reverse-sides of the originals, for example.

Therefore, the processing time is shortened.

Further objects and advantages of the present invention will be apparent from the following description of the preferred embodiment of the invention as illustrated in the accompanying drawings.

BRIEF DESCRIPTION OF THE DRAWINGS

FIG. 4 is an explanatory chart showing the data frame and recording areas in the image memory; and FIG. 5 is an explanatory chart showing an example of image data in the recording areas of FIG. 4.

DESCRIPTION OF EMBODIMENTS

The preferred embodiments of the digital copier according to the present invention will be described with reference to the accompanying drawings.

Figure 1:
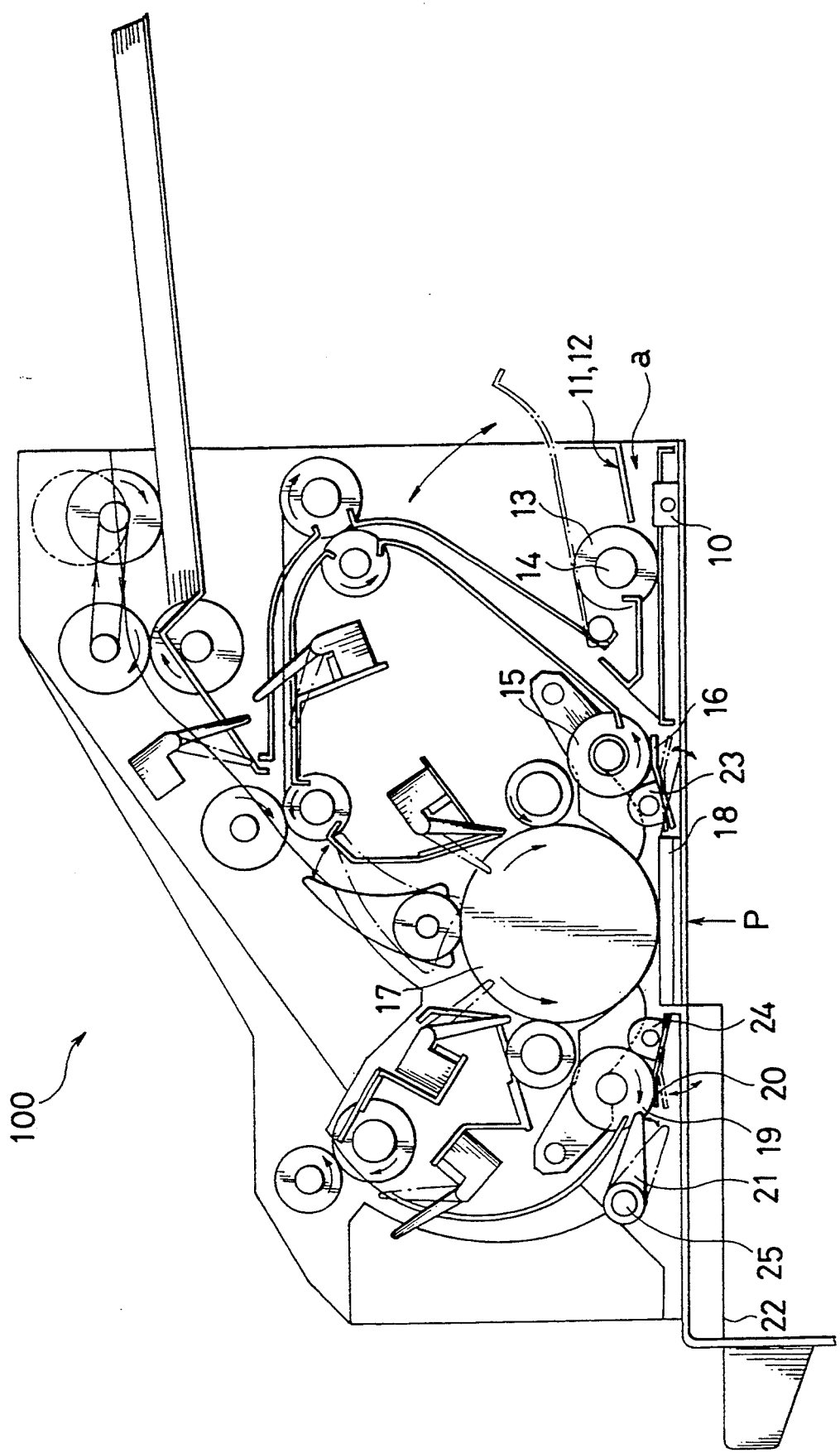
FIG. 1 is a sectional view showing the image reading section of an embodiment of the digital copier according to the invention.
Figure 2:
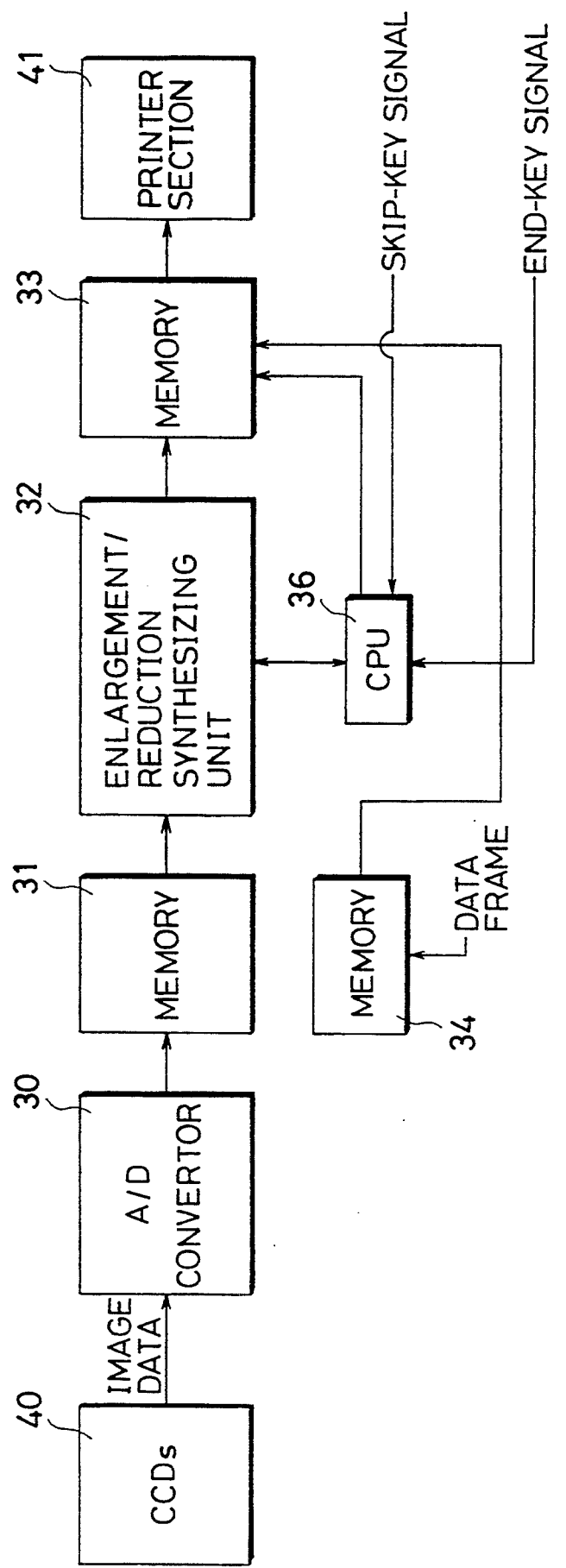
FIG. 2 is a block diagram showing the electrical system of the digital copier in FIG. 1.

FIG. 1 shows a sectional view of an image reading section of a digital copier according to the present invention, and FIG. 2 shows a timing chart of main signals at the image reading section in FIG. 1.

Figure 3:
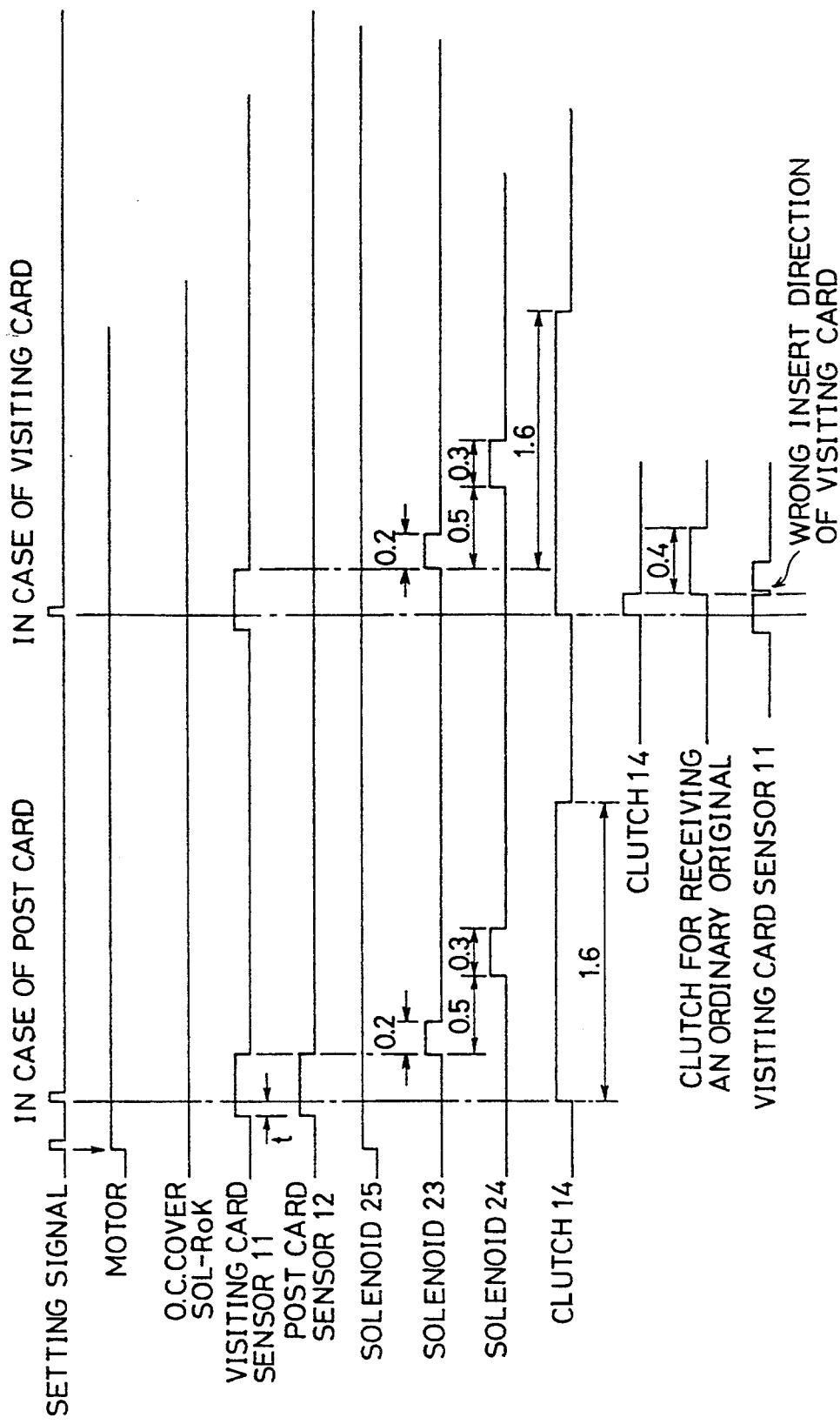
FIG. 3 is a timing chart showing main signals at the image reading section in FIG. 1.

FIG. 3 is a block diagram showing the electrical system of an embodiment of the digital copier.

Referring to FIGS. 1 and 2, the construction and the operation of the image reading section 100 will be described. A standard-size post card (referred to as a post card for simplicity's sake) or visiting card is brought from right to left along the direction of the arrow a into a manual insert port 10 as shown in FIG. 1. There are provided with a visiting card sensor 11 and a post card sensor 12 for detecting a post card or a visiting card inside the manual insert port 10. On the downstream side of the visiting card sensor 11 and the post card sensor 12, there arranged a sheet feed roller 13, a clutch 14 for the feed roller 13, a transfer roller 15 and a movable guide 16, a support drum 17 and a support guide 18 for supporting an original when it is scanned and an image of the underside of the original is read at a reading point P, a transfer roller 19 and a movable guide 20, a discharge guide 21, and a tray 22 for discharged visiting cards and post cards.

The movable guides 16 and 20 are rotated in the arrow directions shown in FIG. 2 by solenoids 23 and 24, respectively, and the discharge guide 21 are rotated in the arrow direction shown in FIG. 1 by a solenoid 25. Under the support glass 18, there is arranged an image reading sensor (not shown), made of CCDs, for example.

When a visiting card/post card reading mode is set by means of an operation unit (not shown), a main motor (not shown) starts running, so that the transfer rollers 15 and 19, and the original support drum 17 start rotating.

The discharge guide 21 is driven by a solenoid 25 to guide a visiting card or a post card in the direction of the sheet tray 22.

When a visiting card or a post card is inserted into the manual insert port 10, the visiting card is detected by both the visiting card sensor 11 and the post card sensor 12, but the post card is detected only by the post card sensor 12.

When the visiting card sensor 11 detects the leading end of the visiting card or the post card, after passage of a specified time t, the clutch 14 is driven, so that the driving force of the main motor is transmitted to the sheet feed roller 13, which roller 13 starts rotating. The visiting card or post card, which is inserted into the manual insert port 10, is taken inside by the roller 13.

When the trailing end of the visiting card or the post card is detected by the visiting card sensor 11 or the post card sensor 12, the solenoid 23 his driven to cause the movable guide 16 to turn so as to press the visiting card or the post card against the transfer roller 15. The visiting card or the post card, even after its trailing end has passed the sheet feed roller 13, is moved towards between the original support drum 17 and the original support glass 18 by the transfer roller 15 and the movable guide 16.

As the visiting card or the post card passes the reading point P between the original support drum 17 and the original support glass 18, the image on its underside is read, and then, the solenoid 24 is driven to cause the movable guide 20 to turn so as to press the visiting card or the post card against the transfer roller 19. And, the visiting card or the post card is guided in the direction of the sheet tray 22 through the discharge guide 21, and ejected out of the image reading section 100.

When both sides of a visiting card or a post card are recorded, if the operator inserts this visiting card or post card into the manual insert port 10 upside down, the visiting card or the post card is fed in the same manner as described, and the image on its reverse side is read. Above this feeding mechanism including the devices 10 to 25, there is provided with another mechanism for conveying an original sheet of B5 or A4 size with turning over the sheet, and reading images on both two sides of the original are scanned and read at the reading point P, but detailed description of it is omitted.

With reference to FIG. 3, description will be made of the detailed construction of the electrical system of the digital copier according to the above-mentioned embodiment.

Images on an original, which are read and converted to analog signals by the image reading sensor made of CCDs at the reading point P, are converted from analog signals to digital signals by an A-D converter 30, and all image data of the sides of each original or all image data of recording areas of each sheet are stored in a memory 31.

In order to arrange a plurality of image data of small size double-sided originals such as visiting cards and post cards on a large record sheet or arranging a plurality of image data of ordinary size double-sided originals in a reduced form on a record sheet, the image data stored in a memory 31 is subjected to a enlargement/reduction process or a synthesizing process by an enlargement/reduction and synthesizing unit 32, is stored in a memory 33, and then outputted to a printer (not shown).

When the number of double-sided originals to be recorded on a record sheet is set by the operator and if the number is six, for example, data frame 35 for recording front-side images of six originals on the left half of a sheet and reverse-side images on the right half of the sheet as shown in FIG. 4 is set in a memory 34 in advance by means of the operation unit (not shown) or by a program.

A CPU (central processing unit) 36 controls the enlargement/reduction and synthesizing unit 32 so that it performs an enlargement/reduction process or a synthesizing process according to the data frame 35.

The operation unit is provided with a skip key for skipping reading of the images of unnecessary sides or blank images of originals when a plurality of image data of double-sided originals are recorded in order on a record sheet, and an end key for storing blank images on the remaining recording areas without the operator's manipulating the copy key with setting any blank sheet when the number of images of originals to be stored in the recording areas is smaller than the number of recording areas of the sheet.

The CPU 36 controls the enlargement/reduction and synthesizing unit 32 so that the above-mentioned synthesizing process is performed according to the manipulation of the skip key or the end key.

The operation of the above-mentioned embodiment will now be described. 3@

When an edit mode for recording a plurality of image data of double-sided originals on a sheet is set, image of one side of each original is read sequentially by the image reading section 100 as shown in FIG. 1, and stored in the memory 31 in FIG. 2.

As shown in FIG. 2, the enlargement/reduction and synthesizing unit 32 under control of the CPU 36, enlarges or reduces the size of images of the respective sides of originals with reference to the size of a record sheet and the data frame 35 in the memory 34 so that the images of the originals can be accommodated in the recording areas of the sheet.

The image data processed in the enlargement/reduction and synthesizing unit 32 are sequentially stored in the recoding areas of the data frame 35 so that the front-side images can be recorded in the left-half frame of the sheet and the reverse-side images can be recorded in the right-half frame of the sheet.

Each time the skip key is pressed, a skip key signal is applied to the CPU 36, and image data which is read next is enlarged or reduced in size by the enlargement/reduction and synthesizing unit 32 so as to be accommodated in a recording area and stored in the memory 33 so as to be placed in a recording area beyond the next by skipping over one area. The CPU 35 counts the sum of the number of originals which have been read by CCDs and the number of manipulations of the skip key, and when the sum agrees with the number of recording areas of the data frame in the memory 34, the CPU 35 reads all image data from the memory 33 and outputs them to a printer section.

A concrete example will be described in which the reverse side (6) of the third original and the reverse side (10) of the fifth original are recorded as blanks, as shown in FIG. 5. After image data "XYZ" of the front side of the third original and image data "MNO" of the front side of the fifth original are read, respectively, if the skip key is pressed, so that the third recording area and the fifth recording area in the right-side storage frame are skipped over, respectively, and the front sides of the fourth and sixth originals which are read next are stored in the left-side storage areas of the fourth and sixth rows, respectively.

In such a manner, unnecessary parts of image data of originals are eliminated and image data of front-sides are recorded on left-side recording areas and image data of reverse-sides are recorded on right-side recording areas. Therefore, since it is not necessary to read unnecessary parts of originals, the appearance of the recorded images on a record sheet is improved and the processing time is reduced.

On the other hand, when the end key is depressed, the CPU 35 counts the sum of the number of originals and the number of manipulations of the skip key. Even if the sum does not agree with the number of data frame 35 in the memory 34, the CPU 36 reads all image data from the memory 33 and outputs the data to the printer.

To be more specific, when the number of originals is smaller than the number of recording areas, it is only necessary to manipulate the end key, which makes it unnecessary for the operator to manipulate the copy key with no original set or with a blank sheet set as an original. Thus, the operation is simplified and the processing time is shortened.

The skip key and the end key may be provided on the operation panel of the copier, or they may be provided at the side of the manual insert port 10 as shown in FIG. 1.

Many widely different embodiments of the present invention may be constructed without departing from the spirit and scope of the present invention. It should be understood that the present invention is not limited to the specific embodiments described in the specification, except as defined in the appended claims.

What is claimed is:

1. A digital copier for recording a plurality of original images on a record sheet in accordance with contents in an image memory, said copier comprising;

means for reading a plurality of original images of respective both sides of originals, which original images are to be recorded on a record sheet in such a manner that a plurality of front-side images of double-sided originals are set on a left side of said record sheet and a plurality of reverse-side images of double-sided originals are set on a right side on said record sheet, a front-side image and a reverse-side image of each original being set side by side;

means for generating a first predetermined signal during successive reading operations of said reading means;

means for generating a second predetermined signal during said successive reading operations;

means for storing a plurality of said read original images in a plurality of memory areas of said image memory, in order of reading, for skipping one of said memory areas without said reading operations of said reading means, when said generated first predetermined signal is applied thereto, so as to store blank data in said skipped one of said memory areas, and for ending said reading operations of said readings means and storing operations of said storing means so as to store blank data in the remaining memory areas of said image memory when said second predetermined signal is applied thereto; and means for recording all of said image data in said image memory on said record sheet in such a manner that a plurality of front side images of double-sided originals are set on said left side and a plurality of reverse-side images of double-sided originals are set on said right side of said record sheet, a front side image and a reverse-side image of each original being set side by side and blank data being set, instead of one of a front-side image and a reverse-side image when said one of a front side image and a reverse-side image is not required to be copied or said record sheet is not filled with front and reverse-side images of originals.

2. A digital copier according to claim 1, wherein said first predetermined signal generating means comprises a skip key for generating a signal when said skip key is depressed, and said second predetermined signal generating means comprises an end key for generating another signal when said end key is depressed.

3. A digital copier according to claim 2, wherein said digital copier further comprises
an operation unit having a copy key for enabling said recording means, and including said skip key and said end key.

* * * * *